United States Patent
Coatney et al.

(10) Patent No.: US 7,293,203 B1
(45) Date of Patent: Nov. 6, 2007

(54) SYSTEM AND METHOD FOR LOGGING DISK FAILURE ANALYSIS IN DISK NONVOLATILE MEMORY

(75) Inventors: Douglas W. Coatney, Cupertino, CA (US); Scott D. Gillette, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 527 days.

(21) Appl. No.: 10/421,124

(22) Filed: Apr. 23, 2003

(51) Int. Cl.
*G06F 11/00* (2006.01)
(52) U.S. Cl. ....................................... 714/42; 714/723
(58) Field of Classification Search ................. 714/42, 714/723
See application file for complete search history.

(56) References Cited

U.S. PATENT DOCUMENTS

| | | | |
|---|---|---|---|
| 5,163,131 A | 11/1992 | Row et al. | |
| 5,313,626 A | 5/1994 | Jones et al. | |
| 5,355,453 A | 10/1994 | Row et al. | |
| 5,485,579 A | 1/1996 | Hitz et al. | |
| 5,664,219 A * | 9/1997 | Glassen et al. | 710/5 |
| 5,740,349 A * | 4/1998 | Hasbun et al. | 714/8 |
| 5,802,366 A | 9/1998 | Row et al. | |
| 5,819,292 A | 10/1998 | Hitz et al. | |
| 5,862,314 A * | 1/1999 | Jeddeloh | 714/8 |
| 5,931,918 A | 8/1999 | Row et al. | |
| 5,941,972 A | 8/1999 | Hoese et al. | |
| 5,963,962 A | 10/1999 | Hitz et al. | |
| 6,038,570 A | 3/2000 | Hitz et al. | |
| 6,058,494 A * | 5/2000 | Gold et al. | 714/42 |
| 6,065,037 A | 5/2000 | Hitz et al. | |
| 6,098,028 A * | 8/2000 | Zwan et al. | 702/120 |
| 6,138,125 A | 10/2000 | DeMoss | |
| 6,189,114 B1 * | 2/2001 | Orr | 714/25 |
| 6,233,108 B1 | 5/2001 | Inoue | |
| 6,282,670 B1 | 8/2001 | Rezaul Islam et al. | |
| 6,385,739 B1 * | 5/2002 | Barton et al. | 714/25 |
| 6,418,543 B1 * | 7/2002 | Goli et al. | 714/38 |

(Continued)

OTHER PUBLICATIONS

David Hitz et al. TR3002 File System Design for a NPS File Server Appliance published by Network Appliance, Inc.

(Continued)

*Primary Examiner*—Scott Baderman
*Assistant Examiner*—Loan Truong
(74) *Attorney, Agent, or Firm*—Cesari and McKenna LLP (57) ABSTRACT

A system and method for logging and storing failure analysis information on disk drive so that the information is readily and reliably available to vendor customer service and other interested parties is provided. The information, in an illustrative embodiment, is stored on a nonvolatile (flash) random access memory (RAM), found generally in most types of disk drives for storage of updateable disk drive firmware. A known location of limited size is defined in the flash RAM, to form a scratchpad. This scratchpad is a blank area of known addresses, formed during the original firmware download onto the memory, and which is itself free of firmware code. This scratchpad is sufficient in size to write a series of failure codes in a non-erasable list as failures/errors (and user/administrator attempts to unfail the disk) are logged. The log of failures always travels with the drive, and can be read by the vendor to determine the general nature of the most recent failure(s) and whether these failures represent a problematic history for the drive.

9 Claims, 7 Drawing Sheets

U.S. PATENT DOCUMENTS

| | | |
|---|---|---|
| 6,425,035 B2 | 7/2002 | Hoese et al. |
| 6,442,711 B1 * | 8/2002 | Sasamoto et al. .............. 714/38 |
| 6,449,625 B1 * | 9/2002 | Wang .......................... 707/206 |
| 6,600,614 B2 * | 7/2003 | Lenny et al. .................. 360/31 |
| 6,647,517 B1 * | 11/2003 | Dickey et al. ................. 714/48 |
| 6,836,856 B2 * | 12/2004 | Blanton ........................ 714/25 |
| 7,222,270 B2 * | 5/2007 | Meaney et al. ............... 714/48 |
| 7,225,367 B2 * | 5/2007 | Hashem et al. ............... 714/48 |
| 2002/0110023 A1 * | 8/2002 | Yoshida .................. 365/185.22 |
| 2003/0048659 A1 * | 3/2003 | Kanamori et al. ..... 365/185.08 |
| 2003/0212936 A1 * | 11/2003 | Neuman et al. ............ 714/723 |
| 2004/0078185 A1 * | 4/2004 | Briggs et al. .................. 703/24 |

OTHER PUBLICATIONS

David Hitz et al. TR3002 File System Design for a NPS File Server Appliance published by Network Appliance, Inc., unknown date.

* cited by examiner

SYSTEM AND METHOD FOR LOGGING DISK FAILURE ANALYSIS IN DISK NONVOLATILE MEMORY

FIELD OF THE INVENTION

This invention relates to networked data storage systems, and more particularly to error reporting in disk drives.

BACKGROUND OF THE INVENTION

A file server is a computer that provides file service relating to the organization of information on storage devices, such as disks. The file server orfiler includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A file server's access to disks is governed by an associated "storage operating system," which generally refers to the computer-executable code operable on a storage system that manages data access, and in the case of filers, implements file system semantics. In this sense, ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

The storage devices in a file server environment are typically disk drives organized as a disk array, wherein the term "disk" commonly describes a self-contained rotating magnetic media storage device. The term disk in this context is synonymous with a hard disk drive (HDD), a direct access storage device (DASD) or a logical unit number (lun) in a storage device. Disk storage is typically implemented as one or more storage "volumes" that comprise physical storage disks, defining an overall logical arrangement of storage space.

In a typical file server or storage area network (SAN) implementation, hundreds of individual disk drives are arrayed to provide storage organized as a set of volumes or similar multi-drive arrangements. Given the large number of disks in a typical implementation, there is a reasonable likelihood that one or more disk drives will experience an operational problem that either degrades drive read-write performance or causes a drive failure. Some problems relate to drive firmware or hardware, including magnetic media, spin motor, read/write head assembly or drive circuitry. Such firmware and hardware problems generally dictate that the disk drive be returned to the original manufacturer for repair or replacement. Other potential problems are user-related, and often result from software problems within the storage operating system or user applications.

A typical user may not be able to differentiate between a disk drive experiencing more-serious firmware/hardware faults or less-serious software problems. Rather the user/administrator often performs only a basic diagnostic of the drive (if possible), and submits the required warranty claim with a brief explanation of the problem (usually in the form of a return merchandise authorization (RMA)) to the vendor's customer service. The explanation may, or may not, accurately describe the problem. Some drives may utilize proprietary methods to record mechanical failure information in internal logs (e.g. SMART data). However, this information is (typically) only available to disk drive vendors and does not allow for operating systems such as Data Ontap to provide input on the nature of why a disk might have been failed.

As a large volume of potentially faulty disk drives are returned, the vendor's customer service department must determine whether the drives are truly faulty or are not faulty. In order to correctly determine the type and degree of problem, each returned disk drive is subjected to a series of failure analysis tests and procedures (read/write test, zeroing of all media locations, etc.) on an appropriate test bed. If the drive passes all tests, it is either returned to the original user or zeroed and placed back into stock for reuse by other customers as so-called refurbished goods. If it fails a test, then it is usually forwarded to the original manufacturer or another facility for repairs and/or credit.

Some faults may elude customer service's diagnostic process if they are hard-to-spot or intermittent in nature. Other faults may linger even after a repair is completed. As such, customers may experience the same fault or problem in a recycled disk drive again and again. It is desirable to provide a readable and writeable storage area within a disk drive that allows error or fault information to be appended to the drive for both diagnostic and historical purposes. This would aid in correctly diagnosing the fault and determining whether a recurring, potentially irreparable fault exists. However, appending this information to the storage media (i.e. the magnetic disk platters) is not necessarily an effective approach, since the media is often one of the more failure-prone elements in a disk drive, and is susceptible to erasure under certain conditions. Rather, a more robust nonvolatile storage location is desired for storing diagnostic and fault information.

SUMMARY OF THE INVENTION

This invention overcomes the disadvantages of the prior art by providing a system and method for logging and storing failure analysis information on disk drive so that the information is readily and reliably available to vendor customer service and other interested parties. The information, in an illustrative embodiment, is stored on a nonvolatile (flash) random access memory (RAM), found generally in most types of disk drives for storage of updateable disk drive firmware. A known location of limited size is defined in the flash RAM, to form a scratchpad. This scratchpad is a blank area of known addresses, formed during the original firmware download onto the memory, and which is itself free of firmware code. This scratchpad is sufficient in size to write a series of failure codes in a non-erasable list as failures/errors (and user/administrator attempts to "unfail" the disk) are logged. The storage operating system, acting through the storage layer, performs a failure analysis when a failure is detected and logs the result of the analysis as a standardized failure code. The log of failures always travels with the drive, and can be read by the vendor to determine the general nature of the most recent failure(s), being embedded in the drive itself, and whether these failures represent a problematic history for the drive. In an alternate embodiment, the scratchpad can be read via network by a diagnostic procedure running on a remote computer of a vendor or other interested party.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

1. System Environment

Figure 1:
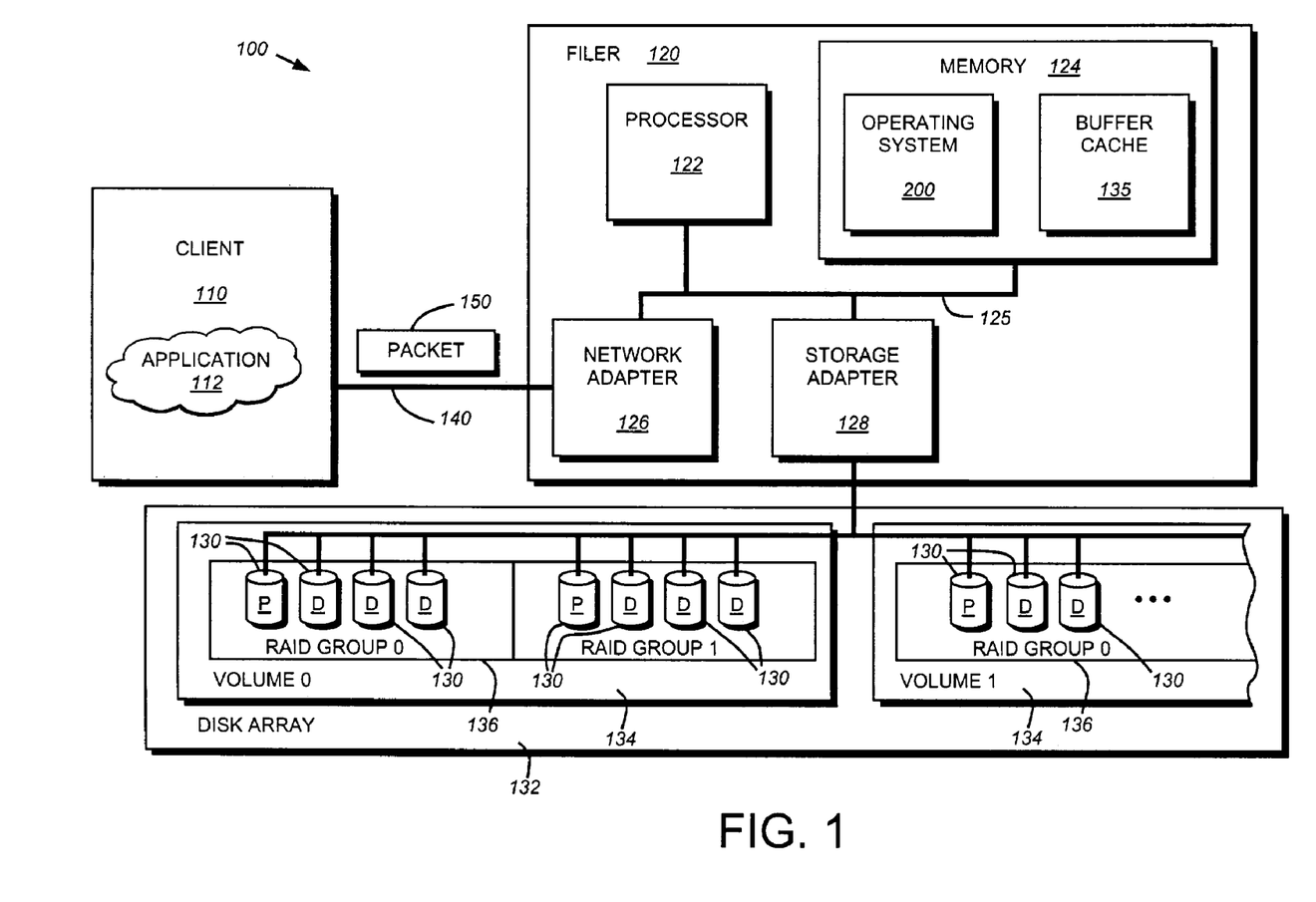
FIG. 1 is a schematic block diagram of a network environment including a file server and disk array that may be advantageously used with the present invention.

FIG. 1 is a schematic block diagram of an environment 100 that includes a client 110 having one or more applications 112, and interconnected file server 120 that may be advantageously used with the present invention. The file server or "filer" 120 is a special-purpose computer that provides file service relating to the organization of information on storage devices, such as disks 130. The filer 120 comprises a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks.

In the illustrative embodiment, the memory 124 comprises storage locations that are addressable by the processor and adapters for storing software program code. A portion of the memory may be further organized as a "buffer cache" 135 for storing data structures that are passed between disks and the network during normal runtime operation. The processor and adapters may, in turn, comprise processing elements and/or logic circuitry configured to execute the software code and manipulate the data structures. The operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112, such as a database application. Moreover, the client 110 may interact with the filer 120 in accordance with a client/server model of information delivery. That is, the client may request the services of the filer, and the filer may return the results of the services requested by the client, by exchanging packets 150 encapsulating, e.g., the CIFS protocol or NFS protocol format over the network 140.

The storage adapter 128 cooperates with the operating system 200 executing on the filer to access information requested by the client. The information may be stored on the disks 130 of a disk array that is attached, via the storage adapter 128 to the filer 120 or other node of a storage system as defined herein. The storage adapter 128 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

In a preferred embodiment, the disk array 132 is arranged as a plurality of separate volumes (Volume 0, Volume 1, etc.), each having a file system associated therewith, as described further. The volumes each include one or more RAID groups 136 of disks 130 denoted generally RAID Group 0, RAID Group 1, etc. In a typical implementation, the RAID groups 136 each include independent physical disks 130 including those storing striped data (D) and those storing separate parity (P) for the data, in accordance with the preferred embodiment that employs a RAID 4 configuration. However, other configurations (e.g. RAID 5 having distributed parity across stripes) are also contemplated. In this embodiment, a minimum of one parity disk and one data disk is employed. However, a typical implementation may include three data disks and one parity disk per RAID group and a multiplicity of RAID groups per volume, as shown.

2. Storage Operating System

To facilitate access to the disks 130 on the array 132, the operating system 200 implements a write-anywhere file system that logically organizes the information as a hierarchical structure of directories and files on the disks. Each "on-disk" file may be implemented as a set of disk sectors configured to store information, such as data, whereas the directory may be implemented as a specially formatted file in which other files and directories are stored. As noted above, in the illustrative embodiment described herein, the operating system is preferably the NetApp® Data ONTAP™ operating system available from Network Appliance, Inc., Sunnyvale, Calif. that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

The organization of the preferred storage operating system for the exemplary file server that can be employed in accordance with an illustrative embodiment of this invention is now described briefly. However, it is expressly contemplated that the principles of this invention can be implemented using a variety of alternate storage operating system architectures.

Figure 2:
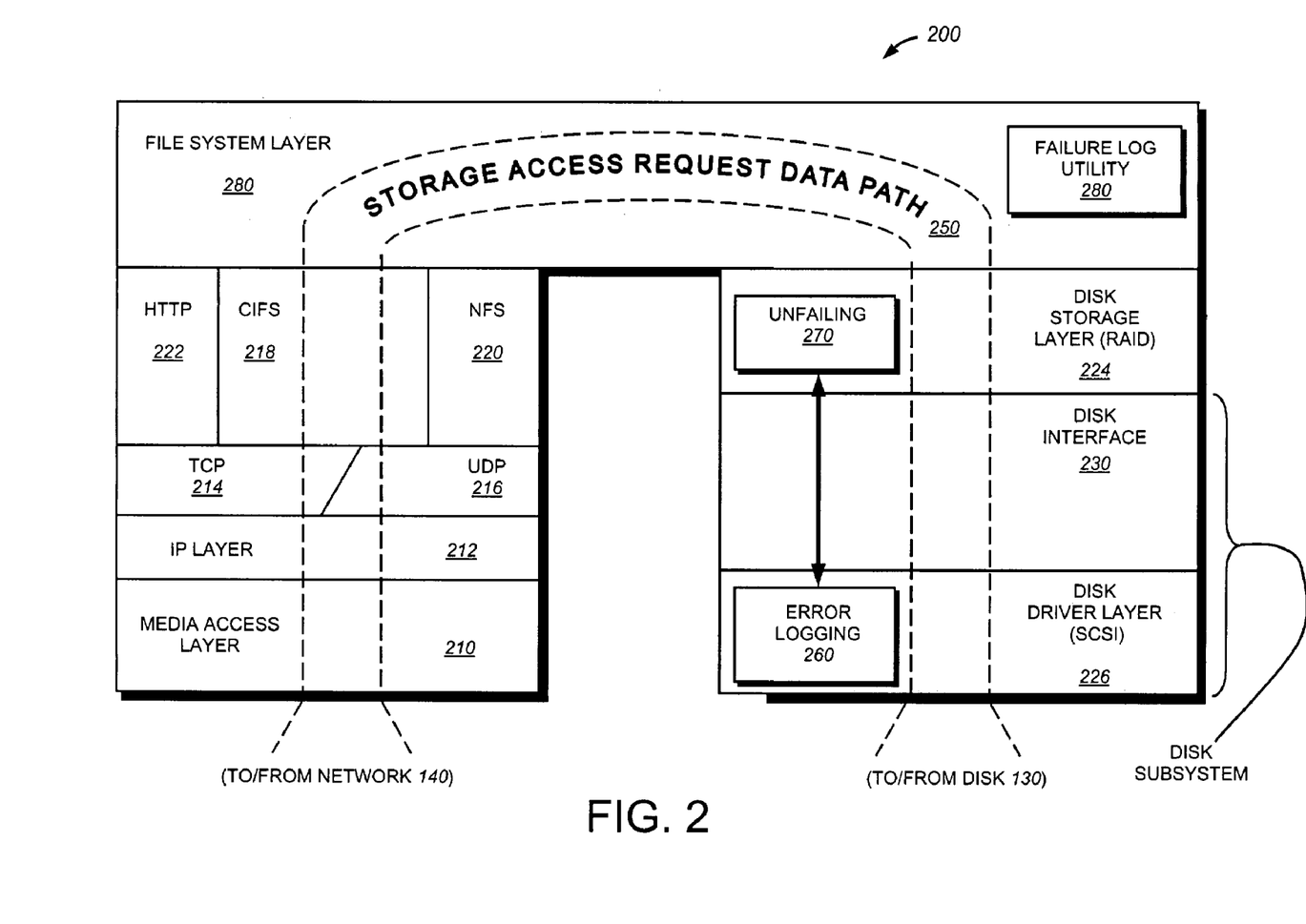
FIG. 2 is a schematic block diagram of an operating system file system layer that may be advantageously used in connection with the file server of FIG. 1.

As shown in FIG. 2, the storage operating system 200 comprises a series of software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the NFS protocol 220 and the Hypertext Transfer Protocol (HTTP) protocol 222. In addition, the storage operating system 200 includes a disk storage layer 224 that implements a disk storage protocol, such as a RAID protocol, and a disk subsystem that includes a disk interface 230 and a disk driver layer 226 that implements a disk access protocol such as, e.g., a Small Computer Systems Interface (SCSI) protocol.

Bridging the disk software layers with the network and file system protocol layers is a file system layer 280 of the storage operating system 200. Generally, the layer 280 implements a file system having an on-disk format representation that is block-based using, e.g., 4-kilobyte (KB) data blocks and using inodes to describe the files. In response to transaction requests, the file system generates operations to load (retrieve) the requested data from volumes 134 if it is not resident "in-core", i.e., in the filer's memory 124.

It should be noted that the software "path" 250 through the storage operating system layers described above needed to perform data storage access for the client request received at the filer may alternatively be implemented in hardware or a combination of hardware and software. That is, in an alternate embodiment of the invention, the storage access request data path 250 may be implemented as logic circuitry embodied within a to field programmable gate array (FPGA) or an application specific integrated circuit (ASIC). This type of hardware implementation can, for some applications, the performance of the file service provided by filer 120 in response to a file system request packet 150 issued by client 110.

It will be understood to those skilled in the art that the inventive technique described herein may apply to any type of special-purpose (e.g., server) or general-purpose computer, including a standalone computer, embodied as a storage system. To that end, filer 120 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

3. Disk Drive Nonvolatile Memory

Figure 3:
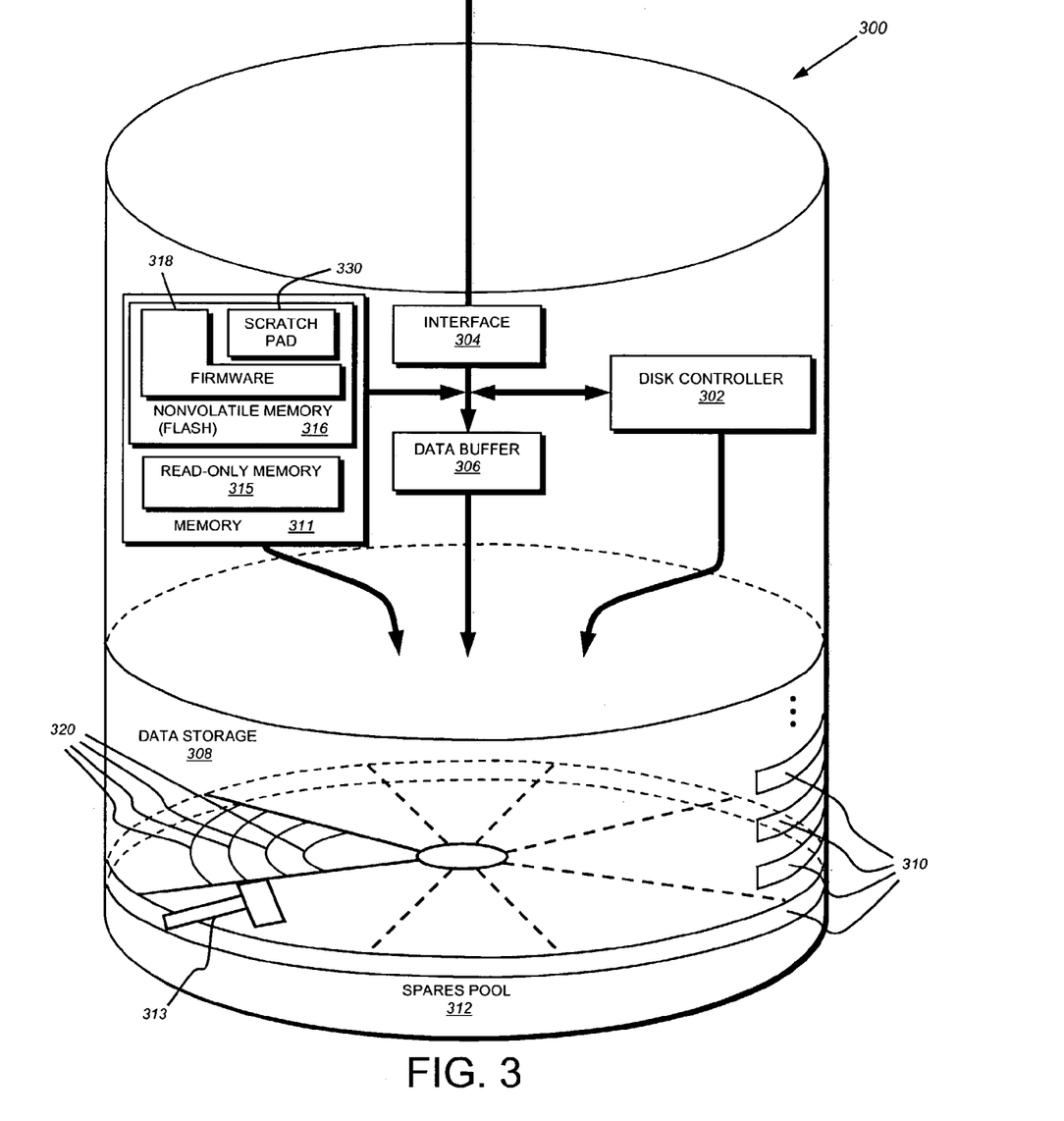
FIG. 3 is a schematic representation of a typical disk drive architecture including a nonvolatile memory (flash RAM) having a scratchpad for logging failure codes according to an illustrative embodiment of this invention.

FIG. 3 depicts an embodiment of a disk drive 300 in accordance with the invention—wherein each of the disk drives 130 of FIG. 1 can be implemented as shown for exemplary drive 300. While differing types and arrangements of disk drives can be used in accordance with the teachings of this invention, the depicted disk drive 300 is a conventional disk drive that may be advantageously employed with the present invention and is somewhat intelligent, having an on-board disk controller 302, a drive interface 304 (such as an IDE (ATA) interface), a data buffer 306, and magnetic data storage 308 implemented as a stack of spinning platters 310 on each of which data may be written or read by means of a respective read/write head 313. The surfaces of the platters define a number of sectors 320, each containing 512 bytes (½ KB) or 520 bytes of information, depending on the type of drive. The physical sectors 320 define a number of concentric circular tracks (e.g. concentric arcs) around the platter. The disk controller 302 controls the read/write heads 313 and platters 310 in performing disk access operations. In addition, a memory structure 311 is shown, consisting of a read-only memory 315 for storing code that remains unchanged and a nonvolatile memory 316 (a flash memory) is provided for storing disk drive firmware 318 employed by the controller 302 in carrying out I/O operations and other disk operations, such as error-reporting. The nature of the firmware used by the disk is well-known to those skilled in the art and is not itself part of this invention. In summary, firmware is the code that is used by the controller to implement drive functions. It can be changed and updated to account for changes in protocols used by the drive to communicate with system device and to add new functionalities, such as the logging functionality described herein. It is loaded during a firmware download process in which all existing firmware (typically) is erased and a new firmware load is installed.

Flash memory is a type of non-volatile memory typically implemented as a computer chip with a read-only (normal operation) memory that retains it's data when power is turned off or lost, and that can be electronically erased and reprogrammed (i.e. "flashed") without being removed from the circuit board in which it is mounted. In contrast, a dynamic random access memory (DRAM), must be continually refreshed even when a charge is applied. Flash memory can be implemented as a special type of EEPROM for which individual bytes cannot be erased and overwritten, but instead, sections (usually termed "blocks") of the device or the entire device are erased in a single operation. While flash memories are typically used currently in commercially available disk drives, future drives may use other forms of memory with which aspects of the invention may be implemented. Accordingly, unless the context dictates otherwise, the term "flash" or "flash memory" shall be used herein in a broad sense to embrace all such memory implementations as may be usefully employed with the invention.

As noted, one advantage to the use of the drive's firmware flash memory to implement the teachings of this invention is that it provides a space that can be written-to once after erasure during a new firmware download. Hence, it is an ideal vehicle for implementing a write-once-read-many recordation of information—such information remaining safely stored in a given location until the next erasure of that location, notwithstanding loss of power, failure of drive components, etc. The non-volatile (flash) memory 315, according to this embodiment is, thus, provided with an unwritten reserved space (32 bytes in one example) 330 for use as a "scratchpad" into which failure information can be provided. The scratch pad is generated during the initial firmware down-load onto the memory by retaining certain addresses of the overall memory as free of any firmware code. These addresses are known to the disk drive controller and can be subsequently used to store a limited number of data relating to failures or errors. This scratch-pad 330 remains in place until another firmware download occurs, at which time it is overwritten. While it remains in the memory, the scratchpad 330 provides a space that is writeable-to one time and readable-from an unlimited number of times. In this manner, the scratchpad serves as a reliable log of error history in the disk. In one embodiment, the scratchpad contains eight 4-byte segments into which various error codes and any un-fail (described below) information can be written. This allows a log of eight error events before space in the scratchpad is exhausted. Of course a smaller or larger scratchpad storage space can be provided as appropriate.

4. Error Logging Procedure

Figure 4:
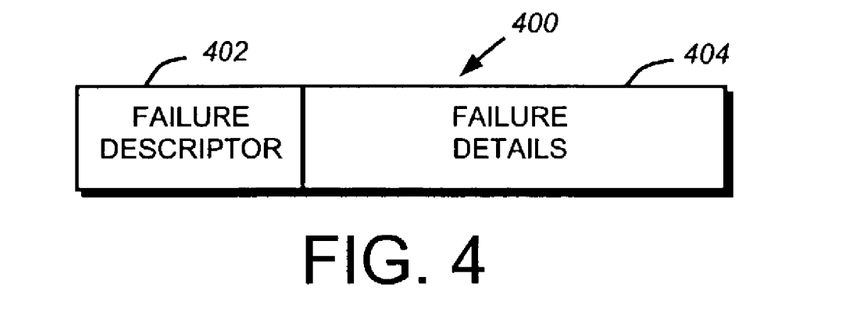
FIG. 4 is a schematic diagram of a an error code entry according to an illustrative embodiment of this invention.

Referring to FIG. 4, an exemplary error code entry 400 for storage in the scratch-pad 330 is shown schematically. In general, the format and content of the error codes may be disk manufacturer-specific. In this example, the error code 400 consists of a 1-byte failure descriptor 402, which is a general category of failure such as internal data corruption error, read error, write error, media defect list errors, head servo error, spindle drive error, overheating condition, other hardware errors, etc. Generally, any type of non-recovered error (e.g. an error for which the disk's error recovery mechanisms have not repaired, and failure has occurred), which information can be derived from, is categorized by the descriptor. Some typical small computer system interface (SCSI)-based errors and status codes are:

02—SCSI Not Ready Error;
04—SCSI Hardware Error;
09—Vendor Unique Code; and
0B—Aborted.

The actual list of errors may be significantly larger, and in fact, any significant error that can be characterized (or a general "uncharacterized" error) can be logged.

Following the descriptor segment 402 is a 3-byte segment 404 of particular information about the failure. This can include identification of erroneous sectors, type of error or any other information that fits within the segment and is helpful to determining possible causes for the failure. Note, the above-referenced scratchpad entries are similar in format and data to existing SCSI sense codes that are ordinarily issued by the disk to the storage driver (SCSI) of the storage operating system to notify the system of a disk failure. The information logged in the scratch pad need not be limited to such a format, nor to only SCSI sense codes, per se. Rather, any information (including non-SCSI information) that can be helpful in determining the failure history of a drive can be appropriate encoded and logged in the scratchpad according to this invention.

Figure 5:
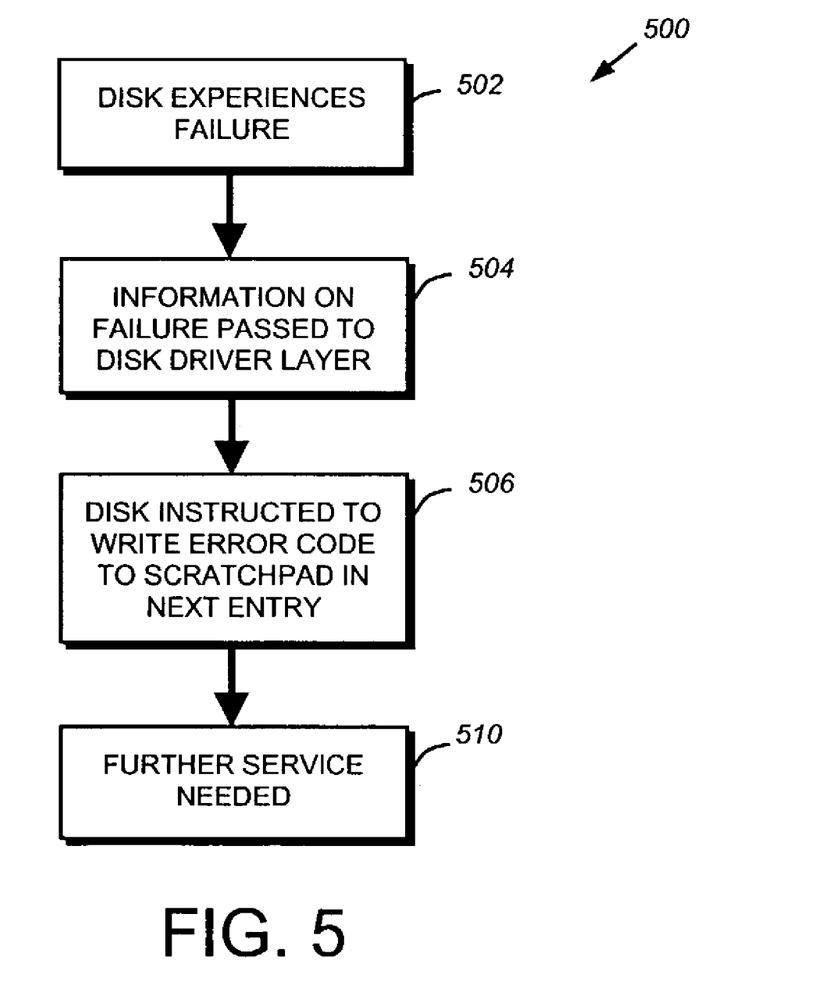
FIG. 5 is a flow diagram of disk failure logging procedure according to an illustrative embodiment of this invention.

Referring to FIG. 5, a procedure 500 for logging the above-described storage driver (SCSI) sense codes into the scratchpad is now described in further detail. Logging occurs when a disk attached to the storage operating system (200 in FIG. 2) experiences a failure (step 502) that is recognized by the disk controller. The information is packaged into a sense code as described above and passed to the disk driver layer (SCSI) (226 in FIG. 2) as shown in step 504. In this embodiment a SCSI log sense command is used to pass the information from the disk to the driver layer. A message regarding the failure is generally provided to the user through the storage operating system. An error logging function (260 in FIG. 2) then writes the sense code from the driver layer 226 into the scratchpad using an update firmware command that addresses a known location in the disk memory (step 506). This location is the preloaded empty space for the scratchpad that was provided when the firmware was initially downloaded. Thus, the storage operating system has knowledge of the location in memory of this location for each disk. The driver layer accesses the known location of the scratchpad using a conventional firmware read command, and reads it for entries. When the storage operating system (through the driver layer) finds the next empty entry in the log, it then places the new error sense code into that unoccupied space. In the unlikely event that all log entries are occupied, then the driver layer refrains from writing further entries. A message may be returned to the user/administrator noting that the log is full. In general, a full log is not, itself a fatal error in this embodiment. However, notification of the full log may prompt the user/administrator to eventually remove the disk for service even if a subsequent unfail (described further below) is successful.

As detailed in final step 510, the failure dictates that further service be applied to the disk drive. At this time the disk is generally inaccessible by the user/administrator as a failed disk drive. The user/administrator can either remove the disk from the system, and send it to the vendor for failure analysis using the above-described RAM process, or the user/administrator can first attempt an unfail operation to gain access to the disk once again.

Figure 6:
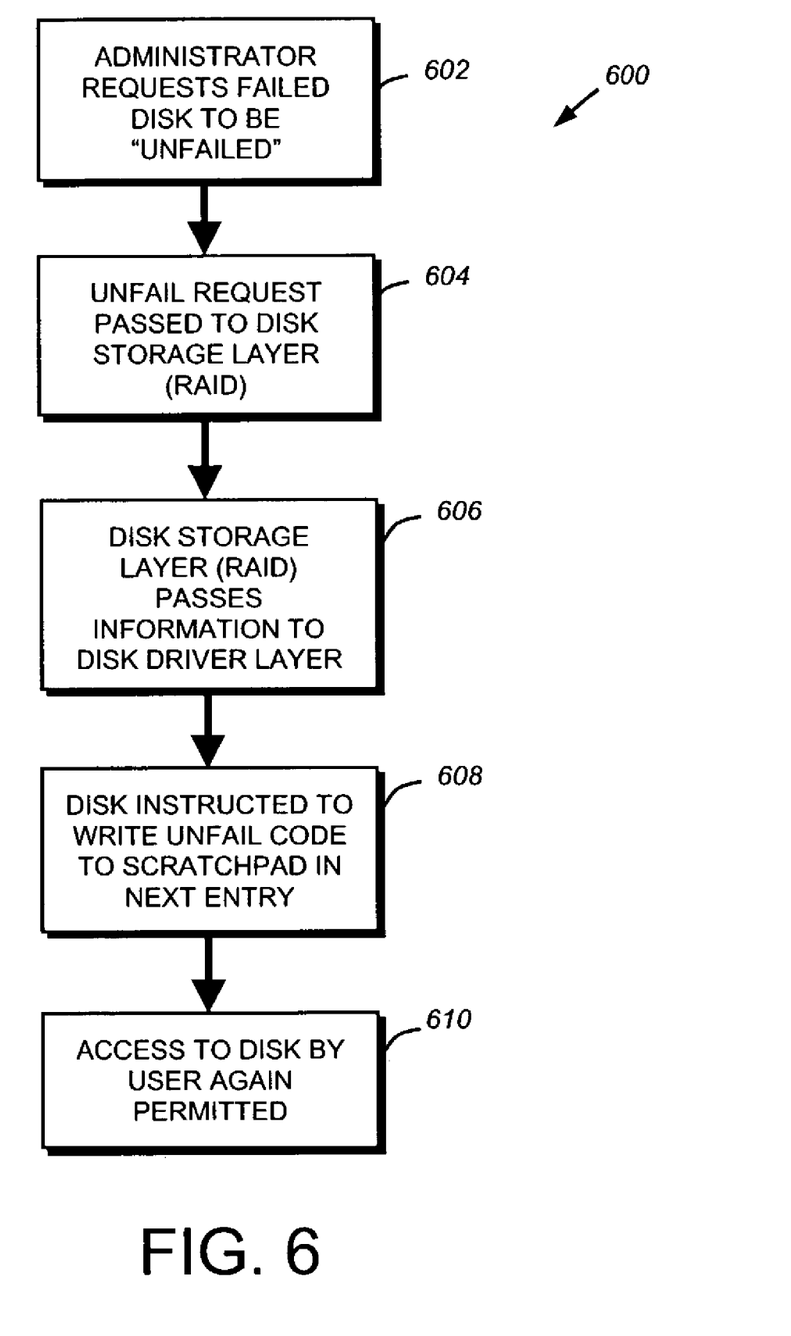
FIG. 6 is a flow diagram of a disk unfail attempt logging procedure according to an illustrative embodiment of this invention.

If the user/administrator decides to attempt to unfail a failed disk drive then the steps of the procedure 600 apply. An "unfail" is where access to the disk is once again enabled regardless of the presence of a previous fatal error. Where disk errors are minor or intermittent, the unfail may be an effective tool to maintaining disk operation. Results of a "successful" unfail attempt on a disk may vary, and the disk may or may not fail again, thereafter.

In accordance with the unfail procedure 602, the user/administrator, having been informed of a disk failure, requests that the failed disk be unfailed via his or her user interface (step 602). The unfail request is passed to the disk storage layer (RAID 224 in FIG. 2) where is handled by an unfail utility 270 (step 604). In accordance with step 606, the storage layer 224, in turn, passes the unfail information to the disk driver layer (226 in FIG. 2). The error logging utility (260 in FIG. 2) instructs the disk to write a code indicating an unfail attempt in the scratchpad in the next available entry, if any (step 608). This unfail code can take any form appropriate to the scratchpad and recognizable by the vendor as such. As denoted in step 610, the disk is now accessible by the user/administrator. It may or may not function correctly and another failure may ensue at any time after the unfail is accomplished. This subsequent failure would also be logged in the scratchpad in the next available space, if any.

It should be clear that the illustrative embodiment specifies the logging of any conditions resulting in: (a) the storage layer (RAID) failing the disk (e.g. logged errors); and (b) conditions wherein an operator specifically requests to use the disk again not-withstanding a previous failure (e.g. logged unfail attempts).

5. Vendor Failure Analysis

Figure 7:
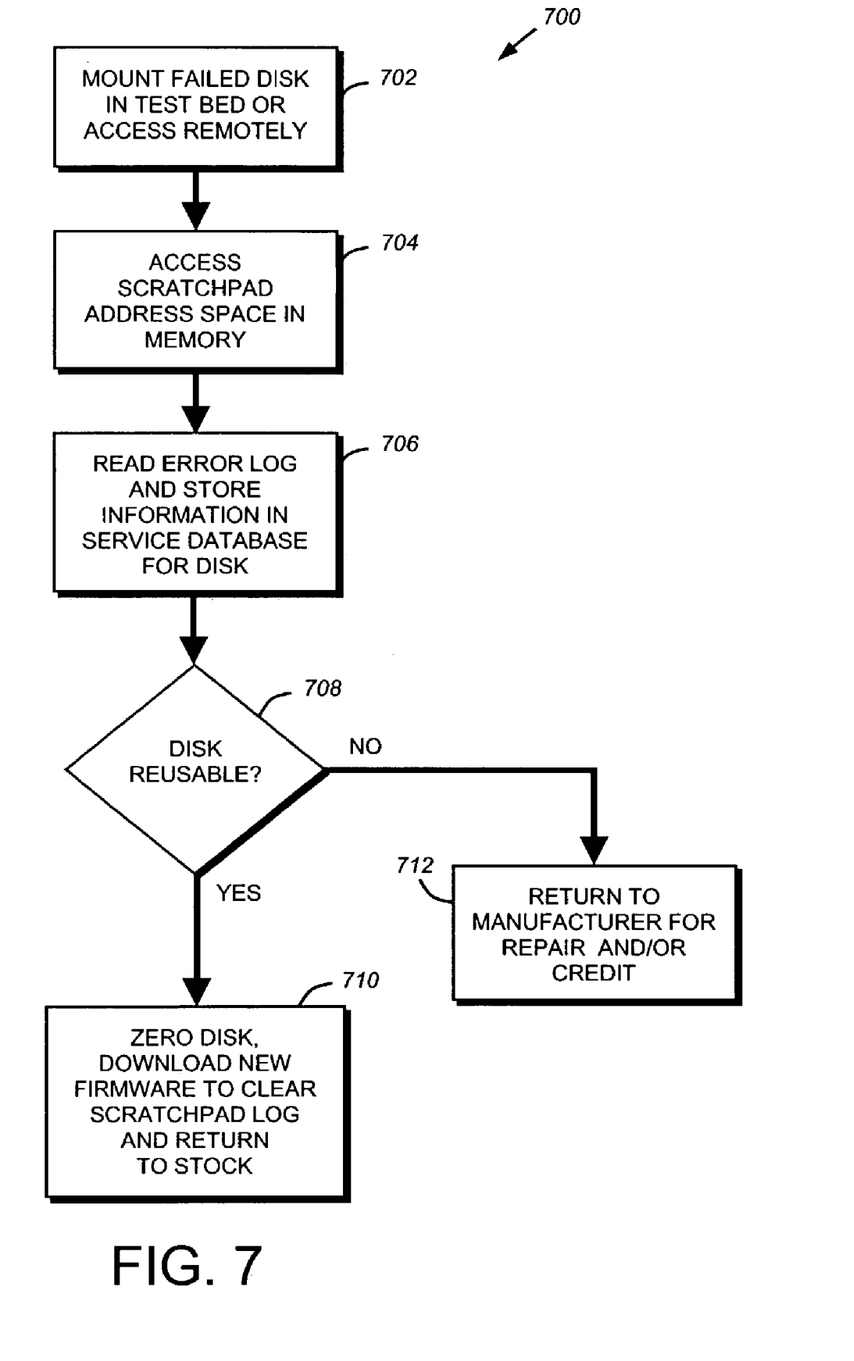
FIG. 7 is a flow diagram of a vendor's failure analysis procedure for reading the failure log of a failed disk according to an illustrative embodiment of this invention.
Figure 8:
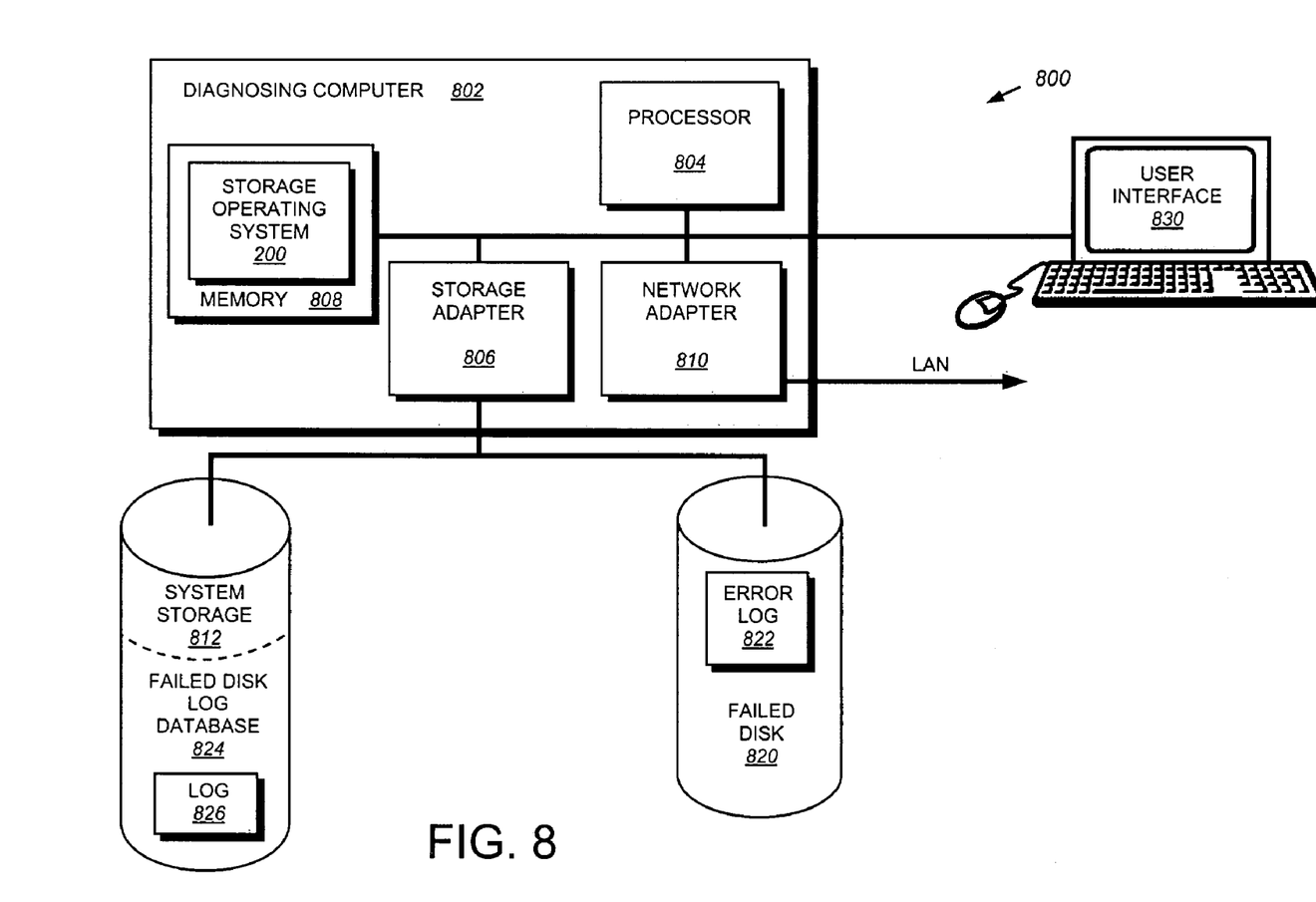
FIG. 8 is a schematic block diagram of a disk drive vendor's diagnostic test bed implementing a failure analysis procedure according to an illustrative embodiment of this invention.

When a disk drive fails, that disk drive is typically returned to the vendor for diagnosis using the RMA procedure described above. FIG. 7 describes a generalized procedure 700 for conducting failure/fault analysis on a disk having an error log according to this invention. Upon receipt, the disk is mounted in a test bed (step 702). This test bed 800 is shown schematically in FIG. 8. It can comprise a disk slot with appropriate connections (SCSI, fibre channel, IDE, etc.) to a diagnosing computer 802. This computer can be a conventional file server (filer 802) having a processor 804, storage adapter 806, memory 808 and network adapter 810 running a version of the storage operating system (200 in FIG. 2). System storage on one or more disks 812 can also be provided through the storage adapter 806. The storage adapter is likewise connected to the failed disk 820, whose error log scratchpad 822 is under analysis. The analysis procedure is controlled and reviewed via a user interface 830 interconnected with the diagnosing computer 802. Within the storage operating system 200 is a failure log utility (280 in FIG. 2) that manages reading and interpretation of the failure log for the vendor. Note that this utility (280) can be present in the user's storage operating system as well for reading the failure log and assisting the vendor with possible remote failure analysis of the disk. It is expressly contemplated that failure analysis can include remote sensing of the log using network connections to communicate from a diagnosing computer station at the vendors (or service provider's) site with the user's file server at the user's site and its connected failed disk. As such a test bed is deemed to include a connection between a diagnosing computer and the user's own storage system, typically via the network adapter 810.

Referring again to the procedure 700, in step 704 of the failure analysis procedure 700, an INQUIRY command (a SCSI read command in this example) is employed to address the log, and its contents are read into the vendor's file server for processing by the log utility 280 (step 706). The log entries are also stored in a database (824 in FIG. 8) under an entry 826 for that disk in the system storage 812 (which can be any storage, direct attached or networked, associated with the computer 802). The database entry for the disk may have been originally established when the disk was first sent to a customer. The disk's unique serial number or World Wide Name, can be used to index the database. The log is then interpreted by automatic and human-based decision processes to determine whether the disk is reusable (decision step 708). The criteria for reusability are highly variable and may involve the accessing of any stored prior history of failures for the disk as well as the type of errors (hardware versus software). This history is established from prior log readings, if any.

If the disk is determined to be reusable (decision step 708), then it is zeroed and a new firmware download is usually made to its flash memory (which deletes the existing log and establishes a new, empty scratchpad at a known location in the flash). Then the disk drive is returned to stock for shipment to a customer as "refurbished goods," or for in-house use by the vendor (step 710). While the original firmware may be maintained in an alternate embodiment, the illustrative embodiment specifies erasure of the log, since the vendor's database has already downloaded the log and placed it in storage in association with the failed disk's records 824 still provides the vendor with a permanent history for the disk based upon all prior log readings.

If, however, the disk is deemed not reusable (decision step 708), then the disk is set aside for return to the original manufacturing facility (or repair department) for repair or credit as a defective drive (step 712). Note that remote diagnosis of the problem can alleviate the need to send the disk drive to the vendor. In this case, the user/administrator can be instructed by the vendor to either ship the faulty disk back to the vendor for reuse or directly ship the non-reusable drive to the manufacture/repair facility. Also, appropriate messages can be provided by the user/administrator to the manufacturer including a readout of the log/history of the faulty disk in advance of any shipment of the disk.

Note, one additional advantage of an error log that travels with the disk according to this invention is in the area of new product quality control. That is, a vendor can check any new drive from the manufacturer by reading the log before it is sent to a customer. If the log is not empty, this implies a used or potentially defective drive was provided by the manufacturer. To further ensure quality, the firmware load provided by the vendor to the manufacture can include links to the vendor's history database. In this manner, the disk is automatically loaded with its complete error log history (within the scratchpad space), preventing the manufacturer from simply erasing the firmware and reloading a clean error free version of the log.

The foregoing has been a detailed description of the invention. Various modification and additions can be made without departing from the spirit and scope of this invention. For example, the principles herein can be applied to any type of disk drive (SCSI, FC, IDE) or other storage device (solid state, electro-optical) that allows for a nonvolatile storage space in which to place an error log, such space being preferably separate from the main storage media which may fail. Accordingly the term "storage device" should be taken broadly to include devices other than disk drives. Also, the log can be used as a vehicle for alerting the user/administrator that it is desirable to replace a disk drive. That is, the storage operating system can be adapted to read the log (at the user's site) and alert the user if the log is becoming full or is reporting a certain type of logged error most-recently encountered suggests replacement is in order. Furthermore, it is expressly contemplated that the processes shown and described according to this invention can be implemented as software, consisting of a computer-readable medium including program instructions executing on a computer, as hardware or firmware using state machines and the like, or as a combination of hardware, software, and firmware. Accordingly, this description is meant to be taken only by way of example and not to otherwise limit the scope of this invention.

What is claimed is:

1. A method for diagnosing errors in a storage device comprising:
   accessing a predetermined known location in a nonvolatile flash memory of a storage device and reading error entries related to error events experienced by the storage device, wherein the known location comprises a scratchpad in a firmware storage area of the memory into which the entries are entered and which is otherwise free of firmware;
   determining whether the error events cause the storage device to be reusable or non-reusable;
   mounting the storage device in a test bed and interconnecting the storage device to a diagnosing computer.

2. A method for servicing a storage device connected in a storage system, comprising:
   A) forming a scratchpad included in a flash memory of the storage device during a firmware code installation process, which scratchpad is free of firmware code;
   B) storing, in an error log, maintained in the scratchpad, entries related to errors experienced by the storage device so as to be readable by a diagnosing computer; the entries including a set of failure codes in a non-erasable list; and
   C) reading, by the diagnosing computer, the error log to determine an error history for the storage device.

3. The method as set forth in claim 2 further comprising performing a failure analysis using the entries in the error log.

4. The method as set forth in claim 3 wherein the step of is initiated by a storage operating system, included in the storage system, and the entries are provided by the storage operating system to the diagnosing computer.

5. The method as set forth in claim 3 wherein the step of performing is performed at the request of the diagnosing computer, and the diagnosing computer is located at a site remote from the storage system.

6. The method as set forth in claim 3 further comprising logging, in the error log, by the storage device at the request of the storage operating system, a result of the failure analysis as a failure code.

7. The method as set forth in claim 4 further comprising reading the scratchpad via a network by a diagnostic procedure running on the diagnosing computer at a remote site.

8. The method as set forth in claim 3 further comprising determining a nature of one or more most-recent failures and generating an alert if the one or more mostrecent failures represents a condition that indicates the storage device should be replaced.

9. The method as set forth in claim 3 further comprising determining whether the scratchpad has a predetermined number of entries, and, in response thereto, generating an alert indicating that the storage device should be replaced.

* * * * *